UNITED STATES PATENT OFFICE.

GEORGE MITCHELL, OF BROOKLYN, NEW YORK.

BITTERS.

SPECIFICATION forming part of Letters Patent No. 301,385, dated July 1, 1884.

Application filed October 24, 1883. (No specimens.)

*To all whom it may concern:*

Be it known that I, GEORGE MITCHELL, of Brooklyn, in the county of Kings and State of New York, have invented a new and useful Specific for Liver Complaints; and I do hereby declare that the following is a full and exact description thereof.

My invention relates to an improved medical compound for the cure of chills and fever, jaundice, malaria, and diseases of the liver generally, and specially as a preventive against yellow fever.

It consists of an infusion of Turkey rhubarb, bitter aloes, cream of tartar, pimento, and quinine, in Holland gin. The proportion of the several ingredients which I have by experiment found best adapted for the end in view are about as follows: of Turkey rhubarb, one ounce; of bitter aloes, one ounce; of cream of tartar, one ounce; of pimento-berries, two ounces, and of quinine, ten grains. These materials in a pulverized condition are placed in one quart of Holland gin and allowed to steep therein a week or more, and when the gin has thus seized upon the qualities of the ingredients added thereto the liquor is drawn off clear and is ready for use.

Although I have found the proportions given to be the most efficacious in general use, still these proportions may be varied within certain limits and yet produce excellent results as a curative agent in diseases of the liver, kidney, and digestive organs.

Licorice-root may be added with advantage to the compound in about the proportion of two ounces of the root to one quart of gin, but it is not an essential ingredient.

Ordinarily, in cases of malaria and diseases of the liver and as a preventive, this compound is to be taken in doses of from two tablespoonfuls to a wine-glassful, at bed-time. In severe cases of chills and fever and for yellow fever the dose may be repeated as often as once every two or three hours.

I am aware that rhubarb, aloes, Peruvian bark, whisky, orange-peel, and coriander-seed have been used heretofore as a medicinal compound or stomach-bitters. The cream of tartar and the gin, when used in the proportions named, in combination with the remaining ingredients, produce a specific beneficial effect upon the kidneys, removing deposits therefrom and otherwise inducing a normal action thereof, which is of great service in bilious complaints, and especially in cases of yellow fever. The pimento is healing and soothing in its properties, and in the combination given seems to promote perspiration and to allay griping.

I claim as my invention—

As a medical compound, an infusion and solution, in substantially the proportions herein set forth, of Turkey rhubarb, bitter aloes, cream of tartar, pimento, and quinine, in Holland gin.

In testimony whereof I have signed my name to this specification in the presence of two subscribing witnesses.

GEORGE MITCHELL.

Witnesses:
  DAVID A. BURR,
  C. L. RIKER.